(12) United States Patent
Kansal et al.

(10) Patent No.: US 7,953,518 B2
(45) Date of Patent: May 31, 2011

(54) ENERGY COST REDUCTION AND AD DELIVERY

(75) Inventors: Aman Kansal, Issaquah, WA (US); Nissanka Arachchige B. Priyantha, Redmond, WA (US); Michel Goraczko, Seattle, WA (US); Feng Zhao, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 12/206,092

(22) Filed: Sep. 8, 2008

(65) Prior Publication Data

US 2010/0063644 A1    Mar. 11, 2010

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G01R 21/00* (2006.01)
*G01R 21/06* (2006.01)

(52) U.S. Cl. ........ 700/295; 700/286; 700/291; 700/297; 702/60; 702/61; 323/299

(58) Field of Classification Search ............... 700/22, 700/286, 291, 295–297; 323/299–303; 705/10; 702/60–62
See application file for complete search history.

(56) References Cited

U.S. PATENT DOCUMENTS

| | | | | |
|---|---|---|---|---|
| 4,023,043 A * | 5/1977 | Stevenson | .................... | 307/38 |
| 4,360,881 A * | 11/1982 | Martinson | .................... | 700/298 |
| 4,655,279 A | 4/1987 | Harmon, Jr. | | |
| 4,731,547 A * | 3/1988 | Alenduff et al. | ................ | 307/85 |
| 5,219,119 A | 6/1993 | Kasper et al. | | |
| 5,761,083 A | 6/1998 | Brown, Jr. et al. | | |
| 6,216,956 B1 | 4/2001 | Ehlers et al. | | |
| 6,366,889 B1 | 4/2002 | Zaloom | | |
| 6,671,586 B2 * | 12/2003 | Davis et al. | ................... | 700/295 |
| 6,785,620 B2 | 8/2004 | Kishlock et al. | | |
| 6,786,421 B2 | 9/2004 | Rosen | | |
| 6,832,135 B2 * | 12/2004 | Ying | ............................. | 700/295 |
| 6,975,926 B2 * | 12/2005 | Schanin | ........................ | 700/296 |
| 7,206,670 B2 * | 4/2007 | Pimputkar et al. | ............ | 700/291 |
| 2002/0103655 A1 * | 8/2002 | Boies et al. | ........................ | 705/1 |
| 2003/0036810 A1 * | 2/2003 | Petite | ................................. | 700/9 |
| 2003/0187550 A1 * | 10/2003 | Wilson et al. | ................. | 700/295 |

(Continued)

OTHER PUBLICATIONS

Hedding. Electronic Programmable Thermostats. http://phoenix.about.com/od/utilities/a/thermostat.htm. Last accessed Jul. 14, 2008, 2 pages.

(Continued)

*Primary Examiner* — Ramesh B Patel
(74) *Attorney, Agent, or Firm* — Turocy & Watson, LLP

(57) ABSTRACT

The claimed subject matter provides a system and/or a method that facilitates managing energy consumption with an energy sink device in order to reduce energy costs. An energy sink device can consume a portion of energy. An interface component can receive a portion of data related to at least one of a real time energy rate or a user presence. An energy manager can dynamically control the energy sink device for efficient consumption of the portion of energy for reduced energy costs based at least in part upon the evaluation of the portion of received data. The energy manager can leverage the real time energy rate and the user presence in order to employ at least one of a power on the energy sink device, a power off the energy sink device, or an adjust a setting for the energy sink device.

20 Claims, 10 Drawing Sheets

U.S. PATENT DOCUMENTS

| | | | | |
|---|---|---|---|---|
| 2003/0200473 | A1* | 10/2003 | Fung | 713/320 |
| 2004/0153170 | A1* | 8/2004 | Santacatterina et al. | 700/1 |
| 2004/0158360 | A1* | 8/2004 | Garland et al. | 700/286 |
| 2004/0252535 | A1* | 12/2004 | Kenny et al. | 363/144 |
| 2005/0071092 | A1* | 3/2005 | Farkas et al. | 702/60 |
| 2006/0276938 | A1* | 12/2006 | Miller | 700/295 |
| 2008/0040296 | A1* | 2/2008 | Bridges et al. | 705/412 |
| 2008/0052145 | A1* | 2/2008 | Kaplan et al. | 705/8 |
| 2008/0272934 | A1* | 11/2008 | Wang et al. | 340/870.11 |
| 2009/0024545 | A1* | 1/2009 | Golden et al. | 705/412 |
| 2009/0093916 | A1* | 4/2009 | Parsonnet et al. | 700/286 |

OTHER PUBLICATIONS

Programmable Thermostat helps Control Peak Energy Use, Mar. 13, 2008. http://findarticles.com/p/articles/mi_m0PIL/is_2008_March_13/ai_n24920980. Last accessed Jul. 14, 2008, 5 pages.

Thermal Comfort Guidelines for Indoor Air Quality. http://www.mass.gov/Elwd/docs/dos/iaq/iaq_389_thermal_comfort.pdf. Last accessed Oct. 10, 2008, 1 page.

Thermal Comfort for Office Work http://www.ccohs.ca/oshanswers/phys_agents/thermal_comfort.html. Last accessed Oct. 10, 2008, 4 pages.

Best Working Temperatures http://www.time.com/time/magazine/article/0,9171,738774,00.html. Last accessed Oct. 10, 2008, 4 pages.

Steve Lohr. Digital Tools Help Users Save Energy, Study Finds. Published online Jan. 10, 2008. http://www.nytimes.com/2008/01/10/technology/10energy.html. Last accessed Oct. 10, 2008, 6 pages.

ISO New England—ISO New England Inc. http://www.iso-ne.com/. Last accessed Oct. 10, 2008, 1 page.

* cited by examiner

ENERGY COST REDUCTION AND AD DELIVERY

BACKGROUND

Saving energy in homes and buildings has increasingly been a concern in light of deplenishing resources as well as management of income and/or costs. Energy consuming devices such as heaters and air-conditioners are consume large amounts of energy. Typically, the above discussed advances in computer technology have enhanced control of devices with the use of schedules, timers, etc. For instance, energy saving thermostats typically employ static schedules that attempt to assign a fixed schedule of a user's home occupancy and/or sleep times. For example, a heater or air conditioning unit can be controlled by an electronic thermostat which can follow daily schedules (e.g., air set at 72 degrees on Mondays and Fridays, etc.). Yet, such electronic thermostats do not provide the amount of granularity of control over such high-energy consuming devices to which consumers demand. On the other hand, computers with significant computational capability are available in most buildings including homes and offices.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate automatically controlling an energy consuming appliance (e.g., energy sink device, etc.) based at least in part upon an evaluation of data related to energy prices. An energy manager can efficiently control and/or manage energy consuming appliances (e.g., heaters, air-conditioners, etc.). In particular, the energy manager can ensure the heaters are used in an efficient manner taking into account various factors such as weather, energy costs, user location, user anticipated location, etc. The energy manager improves the automated controllers in order to spend less energy to provide the desired levels of comfort. In one example, the energy manager can leverage connectivity to external sources of information to improve the control and reduce energy cost. Moreover, the subject innovation can utilize an information delivery component that can deliver relevant information including advertisements to users in a manner that requires least user effort to view it (e.g., the component can deliver relevant advertisement even without the user having to type any search term).

The energy manager can leverage information from external sources such as the Internet and user carried devices to reduce the cost of energy to provide a desired level of comfort. The energy manager can employ an algorithm that uses information such as energy price variation (e.g., demand response pricing), weather changes, and user's presence-absence at home to control the energy expenditure in a manner such that the desired comfort levels are achieved with minimum cost. Additionally, we use the information channels used to send energy saving information to also send other relevant data to users, such as for display on their thermostat screens. In other aspects of the claimed subject matter, methods are provided that facilitate leveraging internal and/or external data for efficient control of an energy sink.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
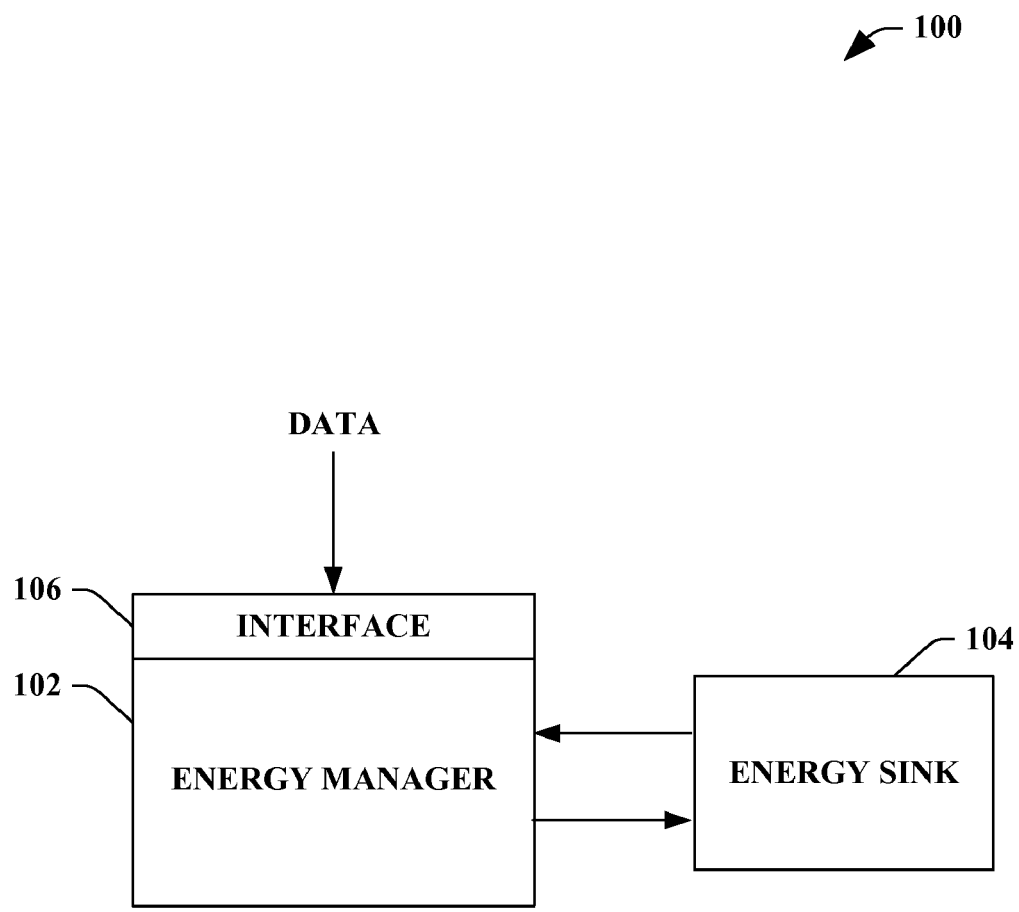
FIG. 1 illustrates a block diagram of an exemplary system that facilitates automatically controlling an energy sink based at least in part upon an evaluation of data related to energy prices.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "data store," "manager," "sink," "device," "network," "engine," "specification," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers. However, alternative forms such as a mechanical implementation of one or more components may be used as well.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates automatically controlling an energy sink based at least in part upon an evaluation of data related to energy rates. The system 100 can include an energy manager 102 that can increase cost-efficiency of an energy sink 104 based at least in part upon analysis of data received via an interface 106. In particular, the energy manager 102 can evaluate received data (internal energy data, external energy data, etc. which is discussed in more detail below) in order to operate or control the energy sink 104. For instance, based upon the analysis of the received data (e.g., energy prices, user presence, energy rates, etc.), the energy manager 102 can ascertain whether to power on the energy sink 104, power off the energy sink 104, adjust a setting associated with the energy sink 104, and/or any other suitable adjustment or manipulation of the energy sink 104. It is to be appreciated that the energy manager 102 can provide efficient power management of at least one energy sink 104 within a location, wherein a location can be a home, a building, a room, a dwelling, an office building, a commercial building, a residential building, a structure, any suitable location that can be served by the energy sink 104, etc.

The energy manager 102 can further leverage data in order to identify advertisements or information. Generally, based upon the evaluation or gathering of various information for power management control, the system 100 can glean insight in regards to locating relevant information (e.g., sales information, advertisements, specials, events, news, etc.). Upon identification of such information, the system 100 can communicate and/or deliver such information to a user via any suitable device or display (e.g., television, monitor, computer, smartphone, plasma display, liquid crystal display (LCD), gaming device, portable media player, etc.). Such advertisement identification and communication techniques of the subject innovation are described in more detail below.

In addition, the system 100 can include any suitable and/or necessary interface component 106 (herein referenced to as "the interface 106"), which provides various adapters, connectors, channels, communication paths, etc. to integrate the energy manager 102 into virtually any operating and/or database system(s) and/or with one another. In addition, the interface 106 can provide various adapters, connectors, channels, communication paths, etc., that provide for interaction with the energy manager 102, the energy sink 104, and any other device and/or component associated with the system 100.

Figure 2:
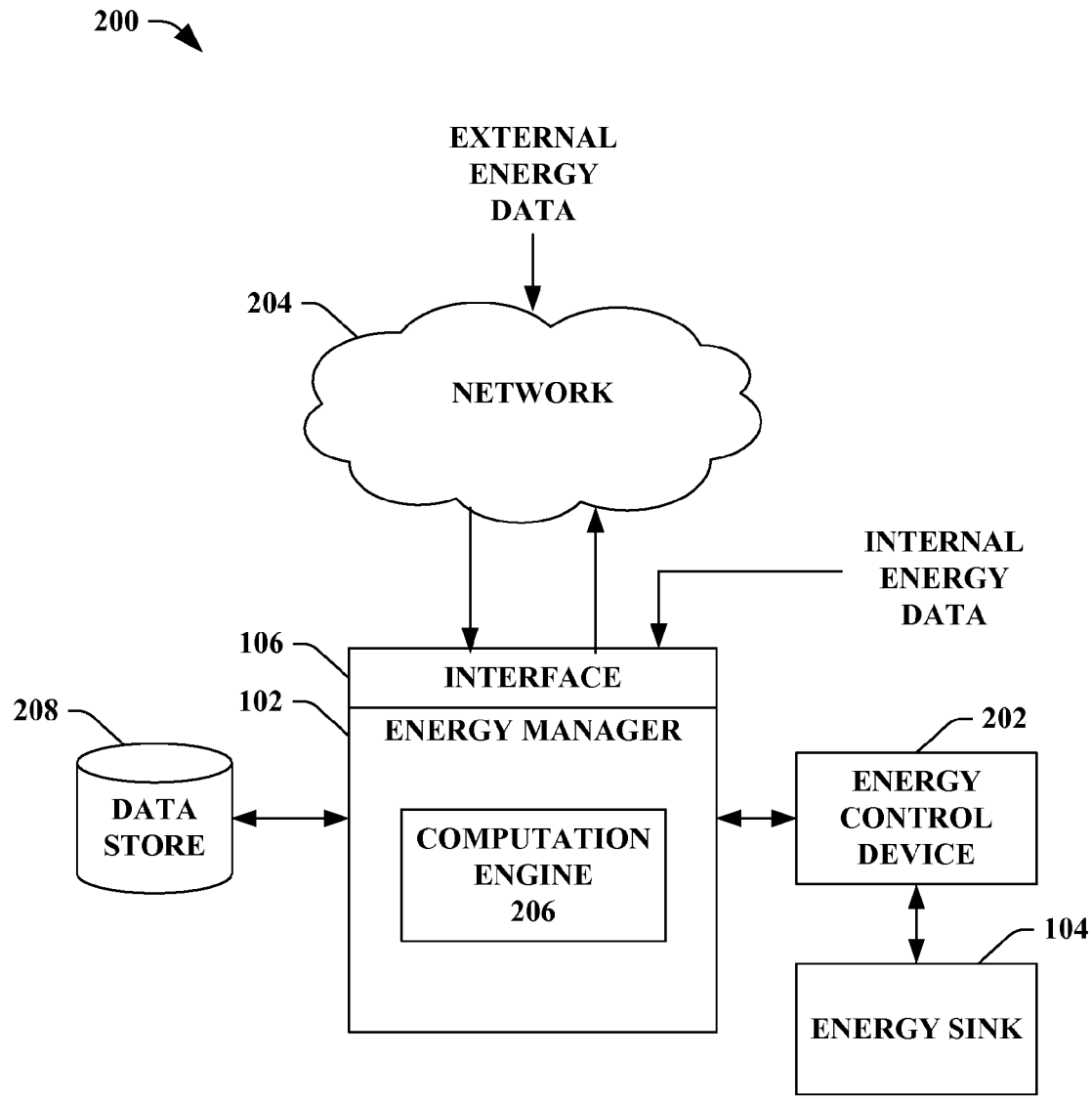
FIG. 2 illustrates a block diagram of an exemplary system that facilitates leveraging internal and/or external data for efficient control of an energy sink.

FIG. 2 illustrates a system 200 that facilitates leveraging internal and/or external data for efficient control of an energy sink device. The system 200 can include the energy manager 102 that can control the energy sink 104 in order to optimize costs associated therewith based at least in part upon analysis of a portion of received data. The interface 106 can receive a portion of data (e.g., external energy data, internal energy data, etc.) which the energy manager 102 can utilize to manage the energy sink via an energy control device 202. For example, a portion of external energy data can be communicated and/or received via a network 204, which the energy manager can evaluate for energy sink 104 control. The interface 106 can also receive internal energy data that the energy manager 102 can leverage in order to provide optimized control of the energy sink 104. The energy manager 102 can include a computation engine 206 that can employ an energy cost reduction algorithm (discussed in more detail below) in order to facilitate controlling the energy sink 104.

It is to be appreciated that the energy sink 104 (e.g., also referred to as an energy sink device, energy consuming appliance, etc.) can be, but is not limited to being, a central heating unit, a portable heater, an HVAC system, an air conditioner, a light, a refrigerator, a household appliance, a freezer, an electronic unit (e.g., cable box, tuner, receiver, stereo, etc.), photo copy machine, a fax machine, a computer, a washing machine, a display (e.g., a monitor, a television, a plasma display, a liquid crystal display (LCD), etc.), and/or any other suitable device that consumes power and can be managed in order to conserve energy. Moreover, the energy control device 202 can be any suitable component that can control the energy sink 104 such as, but not limited to, a switch, a thermostat, a power switch, a digital switch, a mode, a setting on a device, etc.

As discussed, the energy manager 102 can leverage external energy data and/or internal energy data in order to efficiently control the energy sink 104. It is to be appreciated that the external energy data can be, but is not limited to being, energy pricing data (e.g., cost per unit, inferred rates, real time quotes, etc.), weather data, peak load warnings, grid instability data, discounts for energy reduction (e.g., reduction of costs if energy is not used at a particular time, etc.), social networking services, calendar data (e.g., appointments, meetings, birthdays, events, location of events, locations of appointments, location of meetings, etc.), email information (e.g., inferred meetings, inferred or identified events, etc.), global positioning service (GPS) device, group information, forum information (e.g., postings, web forum memberships, etc.), purchases (e.g., online purchases, offline purchases, etc.), monetary information (e.g., income, expenses, profit, investment portfolio information, etc.), medical information (e.g., medical status, diagnostics, medical history, current condition, etc.), sensors (e.g., automobile information, temperature control information within a location, motion sensors, light sensing, heat sensing, temperature sensors, etc.), user state information external to the location, etc. Moreover, the internal energy data can be, but is not limited to being, energy sink data (e.g., make, model, year, type, efficiency rating, consumption rate, etc.), network resources within the home, motion sensors (e.g., to infer occupancy of various rooms within a location, frequency of activity, etc.), heat sensors, security data, lighting use, thermostat data, a portion of user state information internal to a location related to the energy sink, user's explicit information (e.g., preferences, priorities, etc.), etc.

For example, a home with at least one energy sink having at least one room can employ the system 200. Information such as the following can be gleaned: a first room is occupied by children Jane and Alice, while John is expected to be home from work in the next half an hour, while Mary will be back after one hour. Mary and John may use the spa after 2 hours. Suppose at this time, the energy availability information available (e.g., based on the external energy data regarding weather and utility company's energy price, internal energy data, etc.) is that a cold front is expected to hit the area in 20 to 30 minutes which will cause a peak heating energy demand and a peak premium of 25% will be charged for energy used during peak hours by the utility company. The system 200 can then pre-heat John's room at off-peak price before the cold front arrives, to a temperature slightly above John's preferred setting so that when he arrives the room has cooled down to his preferred level and no heating energy is used during the peak demand period. In addition, the peak period information regarding the 25% premium on energy could be sent to the spa (that is also an energy sink). The spa control switch may place this information on its local display, or announce it using a speaker in the audio entertainment system near the spa when the spa control switch is touched. In addition, the display or audio could also serve context sensitive advertisements, such as a coupon-code for a discount on movie downloads provided by information providers on the Internet, along with supplemental content such as celebrity gossip, movie trailers, etc. that allows Mary and John to entertain themselves using lesser energy than would be used by the spa. Such an energy savings scenario along with many others is enabled by the system 200. The proposed system thus helps reduce energy bills, helps utilities to reduce peak provisioning costs, and helps protect the environment by reducing energy usage and production. In addition, the system 200 can also help deliver their services and products to relevant customers with increased efficiency.

The system 200 can deliver external and/or internal information to energy manager 102 which can utilize an energy control algorithm. The energy manager 102 can leverage multiple sources of information (e.g., external energy data, internal energy data, etc.). For instance, external energy data can be provided via the network 204 (e.g., the Internet, a website, a network, a business, a device, a machine, etc.). In one example, such information can include a utility company providing energy price variations, peak load warnings, grid instability data or discounts offered for energy usage reduction at specified times, etc. These sources can also include weather data (e.g., a weather data service, a website, a web feed, etc.) that provides weather forecasts. In another example, the energy manager 102 can utilize a social networking service that provides information (e.g., whereabouts, expected trajectories of the home residents (such as whether they are on their way home), etc.). Another information source type can be internal energy data (e.g., providers within the location to which the system 200 is implemented). Examples of such sources can include network resources within the location (e.g., home, business, etc.) that infer a user's location based on where the resource is accessed from, motion sensors within the location that detect which rooms are occupied if any, a security system that can determine when the users leave or enter the location, etc.

The energy manager 102 can further include the computation engine 206. The computation engine 206 can utilize the external energy data and/or the internal energy data to control the energy sink 104. The computation engine 206 can communicate with the external energy data and/or the internal energy data using, for example, one or more of several possible communication technologies including local area networks, Internet, cellular links, wireless networks, etc. The computation engine 206 can be a separate device, part of existing devices in the location such as a Home Server, a network access point, a portion of software executed on a home computer, a portion of software, and/or any suitable combination thereof. The energy control device 202 can be connected to the energy sink 104 in order to control the energy supplied to such energy sink 104.

The system 200 can further include a data store 208 that can include any suitable data utilized and/or accessed by the energy manager 102, the energy sink 104, the interface 106, the energy control device 202, the network 204, the computation engine 206, etc. For example, the data store 208 can include, but not limited to including, external energy data, internal energy data, energy sink device characteristics (e.g., makes, models, settings, configurations, types, number, etc.), user preferences (e.g., temperature settings, lighting levels, room preferences, schedule, personal tastes, etc.), location data (e.g., home, office, building, number of rooms, venting configuration, devices available, lighting information, etc.), remote control settings (e.g., passwords, usernames, device availability, etc.), security (e.g., opting in information, security preferences, opting out settings, restrictions on data collection, etc.), algorithm data, control specification data, advertisements, user-generated ad profiles, communication preference for advertisements, etc. Moreover, although the data store 208 is depicted as a stand-alone component, it is to be appreciated that the data store 208 can be a stand-alone component, incorporated into the energy manager 102, the energy sink 104, the interface 106, the network 204, the energy control device 202, and/or any suitable combination thereof.

It is to be appreciated that the data store 208 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 208 of the subject systems and methods is intended to comprise, without being limited to, these and any other suitable types of memory. In addition, it is to be appreciated that the data store 208 can be a server, a database, a hard drive, a pen drive, an external hard drive, a portable hard drive, and the like.

Figure 3:
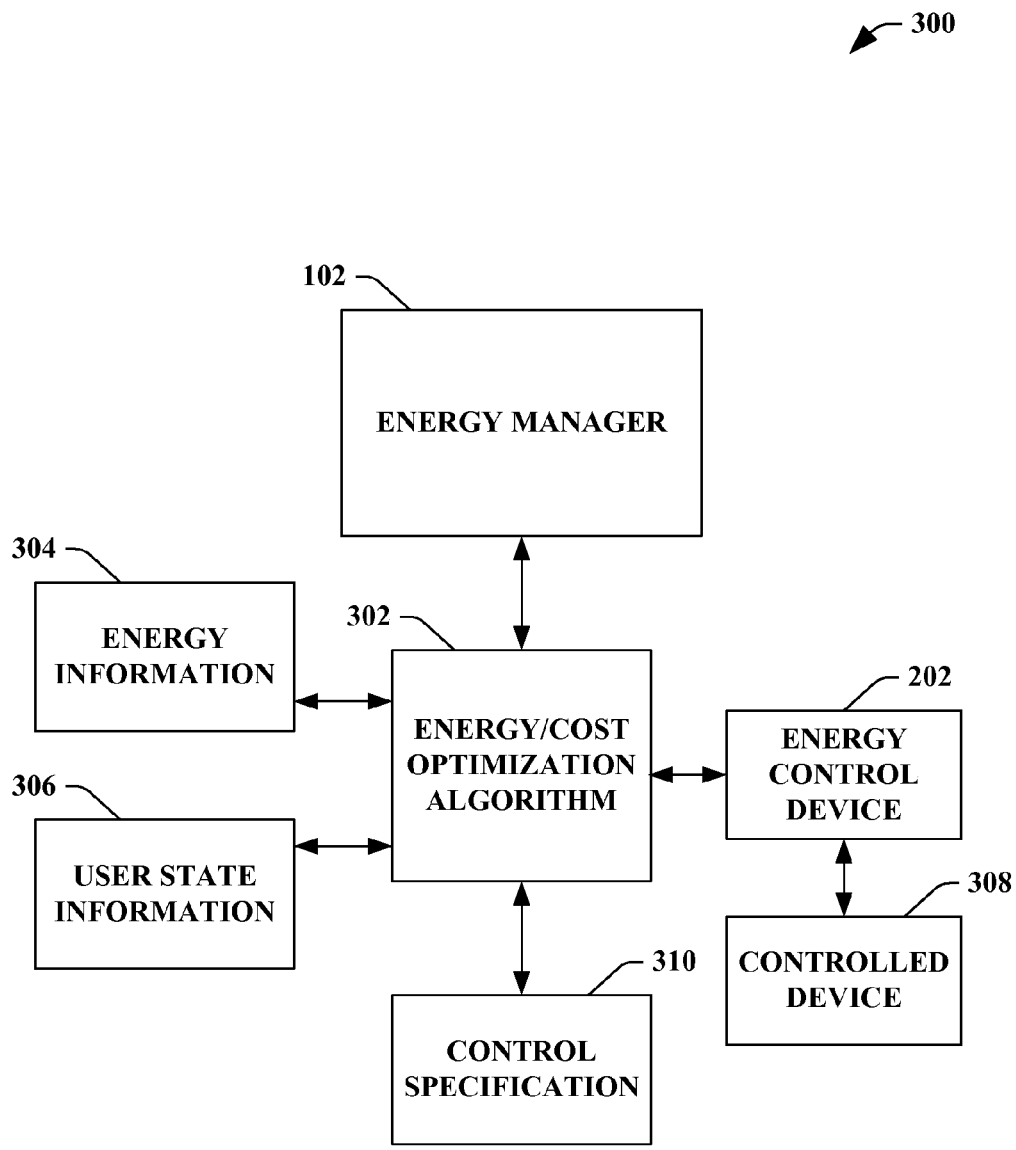
FIG. 3 illustrates a block diagram of an exemplary system that facilitates utilizing an algorithm for power management for improved cost-performance.

FIG. 3 illustrates a system 300 that facilitates utilizing an algorithm for power management for improved cost-performance. The system 300 can include the energy manager 102 that can utilize various energy control algorithms. The energy manager 102 can evaluate data (e.g., internal data, external data, etc.) to efficiently manage energy sinks in order to reduce costs of using such devices. In particular, the energy manager 102 can implement two algorithms in connection with the subject innovation.

The energy manager 102 can utilize an energy/cost optimization algorithm 302. The energy/cost optimization algorithm 302 can represent the algorithm used to optimize energy cost. This algorithm can accept input data such as energy information 304 (e.g., internal and external energy data), and user state information 306 (e.g., user inferred whereabouts). The algorithm can accept a third type of input such as a control specification 310. The control specification 310 can define a comfort level or setting desired by the user. The control specification 310 can include, but is not limited to including, the temperature, lighting, a music level, and/or any other settings that can be maintained in a room. It can also include multiple settings depending on whether the user is awake, asleep, exercising, etc. Furthermore, the control specification 310 can include multiple settings that depend upon which user is present or which set of users is present. The system 300 can further include a controlled device 308 (also referred to as an energy sink). The controlled device 308 can receive the outputs computed by the energy/cost optimization algorithm 302. It is to be appreciated that the controlled devices (e.g., energy sink, energy consuming appliance, etc.) can be controlled via additional components such as thermostats, light switches, or electronic relays.

In another example, the user's desired comfort settings can be inferred. For example, user health history, house usage history, demographic data, data provided by a user, etc. can be leveraged in order to determine a particular comfort setting(s) for the specific user. In general, the system 300 can provide user-specific comfort settings either specifically defined by the user, inferred, and/or any suitable combination thereof.

The energy manager 102 can utilize a first algorithm that can utilize energy price data and the weather forecast to optimize energy cost. It is to be appreciated that the algorithm described is an example and is not to be limiting on the subject innovation. Energy prices can vary in response to energy demand in many energy distribution systems and the algorithm discussed can take advantage of low price periods to achieve desired comfort levels at lower cost. The algorithm is described with respect to a location in which the location has a single heating or cooling unit (e.g., energy sink, energy sink device, etc.) that can treat the location as at least a single zone. The algorithm can be applied to various locations such as, but not limited to, buildings, homes, businesses, individual rooms, groups of rooms, groups of areas, zones, etc.

The energy manager 102 can divide time into slots. For example, each slot can be m minutes in length (use m=30 in illustrations). The algorithm proceeds in the following steps discussed below.

Step 1, Training: In this step, the algorithm can learn the heating and cooling properties of the heating and cooling equipment as well as the heat loss or gain characteristics of the location. These properties can be modeled as follows: suppose the heater (which is the energy sink controlled in this instance of the algorithm) can supply Q1 units of heat per slot when turned on at power setting P1, Q2 units at setting P2, . . . , Qn units at setting Pn. Similarly, suppose the cooling equipment can pump out R1 units of heat at power setting S1, . . . , and Rm units at setting Sm. It is to be appreciated that heat loss or gain for a location can be proportional to the difference in indoor and outdoor temperatures. Suppose when the outdoor temperature, denoted T_out, is colder than the location temperature, denoted T_in, the location looses heat as follows:

$$dQ=a*(T\_in-T\_out),$$

where dQ represents the amount of heat lost. Suppose when outdoor temperature is hotter than the location, the location can gain heat as follows:

$$dQ=b*(T\_out-T\_in).$$

Note that b is a negative value, since in this case dQ is negative. Suppose the drop in location temperature is related to change in heat content as follows:

$$dT=c*dQ.$$

Note that c is a positive value, making dT positive when dQ is positive.

In the training phase, during winters, the algorithm can measure T_in and T_out for several slots with the heater set to power setting P1, P2, . . . Pn, and also with the heater turned off. Let T_in(i) and T_out(i) denote indoor and outdoor temperatures at end of slot (i) respectively. For each slot, the heat change and temperature change equations are:

Slot 1:

$$dQ=-Q1+a*(T\_in(1)-T\_out(1));$$

$$dT=c*dQ; \text{ and}$$

$$dT=T\_in(1)-T\_in(0)$$

assuming heater power setting was P1. Similarly, the equations can be written for each slot using the appropriate heater power level and temperature values. When several slots have passed, enough equations can be obtained such that the equations obtained can be used (e.g., using linear equation solver method, etc.) to calculate the values of Q1, Q2, . . . Qn, a, b, and c. Similarly, during summers, the parameters R1, . . . Rm can be learned.

Suppose the energy consumption when the heater supplies heat Q1 is e1*Q1. And so on for each setting. Q(x) can denote heat supplied per slot at a setting P(x) when the exact setting number is not known (such as when it is yet to be computed using the algorithm).

In certain cases, Q1, . . . Qn, R1, . . . Rm can also be known from specifications and then fewer equations may be needed (e.g., training phase can utilize fewer slots, etc.) to learn only a, b, and c. If a, b, and c are also known from other methods/techniques, such as the thermodynamic model of the location produced using its architectural plans and insulation material specifications, the training phase may be not employed.

In one example, the training phase can be executed once. In another example, the training phase can be implemented periodically in order to adjust for any potential changes, manipulations, building remodeling, etc. Furthermore, the training phase can be executed again when the location insulation is changed, windows are changed, new rooms are added, heating/cooling equipment is changed, or any other event occurs that may affect the parameters learned in the training phase.

Step 2. Initialize: Energy price information can be identified for the next k slots. For illustration, k=48, which can imply that price information is obtained for the next 24 hours assuming slot length, m=30 minutes. Suppose the energy price is D(i) for slot (i), measured in dollars (e.g., local currency units) per unit of energy. The energy price information may be provided by the utility, such as when day ahead market clearing is used to determine energy prices for an entire day in advance. In another example, the energy pricing can be provided in real time from the utility (e.g., company opts in to participate, etc.). Moreover, the pricing information can be provided by a forecasting service that uses historic prices, weather, or other data to predict these prices. The energy price information may also be predicted based on historic prices. The desired temperature settings can be obtained: the maximum and minimum temperatures, T_max(i) and T_min(i) in slot (i) respectively, acceptable for the next k slots. For illustration, suppose the desired temperature is set to be within 69 F and 70 F for all k slots. Also, the algorithm can obtain the T_out(i) expected over the next k slots from a weather forecasting service.

Step 3. Calculate energy expenditure schedule: The identified information can be utilized to determine and/or ascertain when energy will be spent. The procedure can be described for any suitable season (e.g., winter, spring, summer, fall, etc.). For instance, the below is described for a winter season, when heating is to be used. The procedure can be similar for summer when cooling is used or for other times when one of heating or cooling is used in different slots within the k slots being planned. The heat change in each slot can be $$dQ(i)=a^*(T\_in(i)-T\_out(i))-Q(x(i))^*f(i)$$

where Q(x(i)) represents the heat supplied per slot at power setting P(x(i)) and f(i) represents the fraction of time for which the heater is turned on within the slot. The actual heater usage, e.g., the time duration for which the heater is turned on within a slot and at what power setting, is to be determined as part of this calculation.

The cost of energy, C(i) in slot (i), is:

$$C(i)=D(i)^*e(x(i))^*Q(x(i))^*f(i).$$

The indoor temperature during the current slot is:

$$T\_in(i)=T\_in(i-1)+c^*dQ(i).$$

The comfort settings dictate:

$$T\_in(i)>=T\_min(i);\text{ and}$$

$$T\_in(i)<=T\_max(i).$$

Similar constraints can be written out for each (i)=1, ..., k. The total cost, TC, over k slots can then be computed as:

$$TC=\Sigma C(i)$$

Where $\Sigma$ denotes summation over i=1, ..., k.

The above equations written out for each i=1, ..., k yield a linear program which can be solved for the optimization objective of minimizing TC using linear program solvers. The variables in the equations are T_in(i), f(i) and x(i) for each (i)=1, ... k. Other parameters: T_out(i), a, and c are known. Note that some of the f(i) may come out to be zero implying that heater is not used in those slots.

Step 4, Adaptation: Note that the energy price data D(i) or outdoor temperature data T_out(i) can change after the calculation at step 3 at the beginning of k slots. Note that the temperature until any time point is within the desired range. If a change occurs at slot j, the T_out(i) and D(i) for i=j, ..., k are changed for subsequent slots and a calculation similar to step 3 is carried out for remaining slots i=j, ..., k.

As an illustration, consider a heater that has a single power setting Q1. In this case x(i)=1 for all slots. T_max=70 F, T_min=69 F. The parameters a and c were identified for a home. Parameter b is related to cooling and is not considered in this example. Here, k=48 and m=30 min. Suppose T_out=40 F for all slots.

An indoor temperature, T_in(i) can be computed using the algorithm described above for the 48 slots and also can be compared to the naïve case when the optimization algorithm described above is not used. In the naïve case, the thermostat can heat the location to T_max, and waits until the temperature falls to T_min. Then, it again heats the location to T_max and so on. With the optimization algorithm described above, the operation can exist in which the optimization based method raises the temperature in lower price periods, and avoids heating during peaks to the extent possible without violating the comfort settings. Over the total of k=48 slots, the algorithm can provide an energy cost saving with a particular energy price.

It is to be appreciated that the above can be implemented when 'a' and 'b' are not constant. In other words, the above description is a heat gain/loss model where the parameters 'a' and 'b' were constant. While this is a reasonable assumption for typical location, it may not be true for all locations or other areas. These parameters can depend on temperature, due to differences in construction materials or temperature ranges of variation among other factors. Similarly, some of the other parameters used in the equations, such as Q(i), R(i), may not be constants but functions of temperature ranges or other parameter values within the equations. In such cases the optimization problem formulated in step 3 of the above algorithm may not be a linear program. However, for most cases, the problem can still be solved, such as using non-linear optimization techniques such as nonlinear programming.

The energy manager 102 can utilize a second algorithm that can modify the above algorithm to use additional external information such as user presence/absence information to further improve the energy cost. Suppose user presence at a location in slot (i) is denoted by O(i) where O(i)=1 means user is at the location and O(i)=0 means no one is at the location. The algorithm proceeds as follows.

Step 1, can be a training technique similar to the training associated with the first algorithm (discussed above).

Step 2: Initialize: T_safe_max can represent the maximum safe temperature that the location may be put to when the user is not at the location and T_safe_min represents the lowest safe temperature that the location may be put to when the user is not present. After obtaining the price, T_out and desired setting data as in the first algorithm, this step changes the desired temperature setting as follows: Obtain O(i) for i=1, ..., k. The O(i) may be predicted using past user behavior. For i=1, ..., k: If O(i)=0, set T'_min(i)=T_safe_min and T'_max(i)=T_safe_max. If O(i)=1, set T'_min(i)=T_min (i) and T'_max(i)=T_max.(i).

Step 3, the calculation can be similar to that of the first algorithm except that T'_min and T'_max can be used instead of T_min and T_max. This allows the algorithm to reduce the energy cost even lower than the first algorithm.

Step 4: The adaptation of D(i) and T_out(i) can change as in the first algorithm. For changes to O(i), if O(i) was previously used as O(i)=1 but true O(i)=0, the correct O(i) can be recalculated. Since the desired temperature setting is not violated when O(i) is used as 1, there is no other issue. If on the other hand, O(i)=0 was used but O(i)=1 is the true value at a particular slot, then, the temperature at this instance may be outside the desired range (for instance, if the previous slot had O(i)=0 and the optimization had found T_in to be below T_min though above T_safe_min). In this case, the heater should be turned on immediately at highest power setting to bring the location to within the desired range. Now the calculation should be carried out again for the remaining slots. Note that wrong O(i) used at initial calculation time can lead to some minutes of discomfort for the user in this algorithm. For instance, if the user comes home unexpectedly at a time when O(i) was originally thought to be 0, it may take a few minutes for the home to warm up.

Several extensions can be implemented with the second algorithm. For instance, the desired temperature settings can be changed based on humidity levels measured in the location and its known effect on desired comfortable temperature, using motion sensors to determine when the users are more active (e.g., needing less heat) or sleeping, using artificial intelligence algorithms to infer when users are likely to be present, or absent, and so on.

Figure 4:
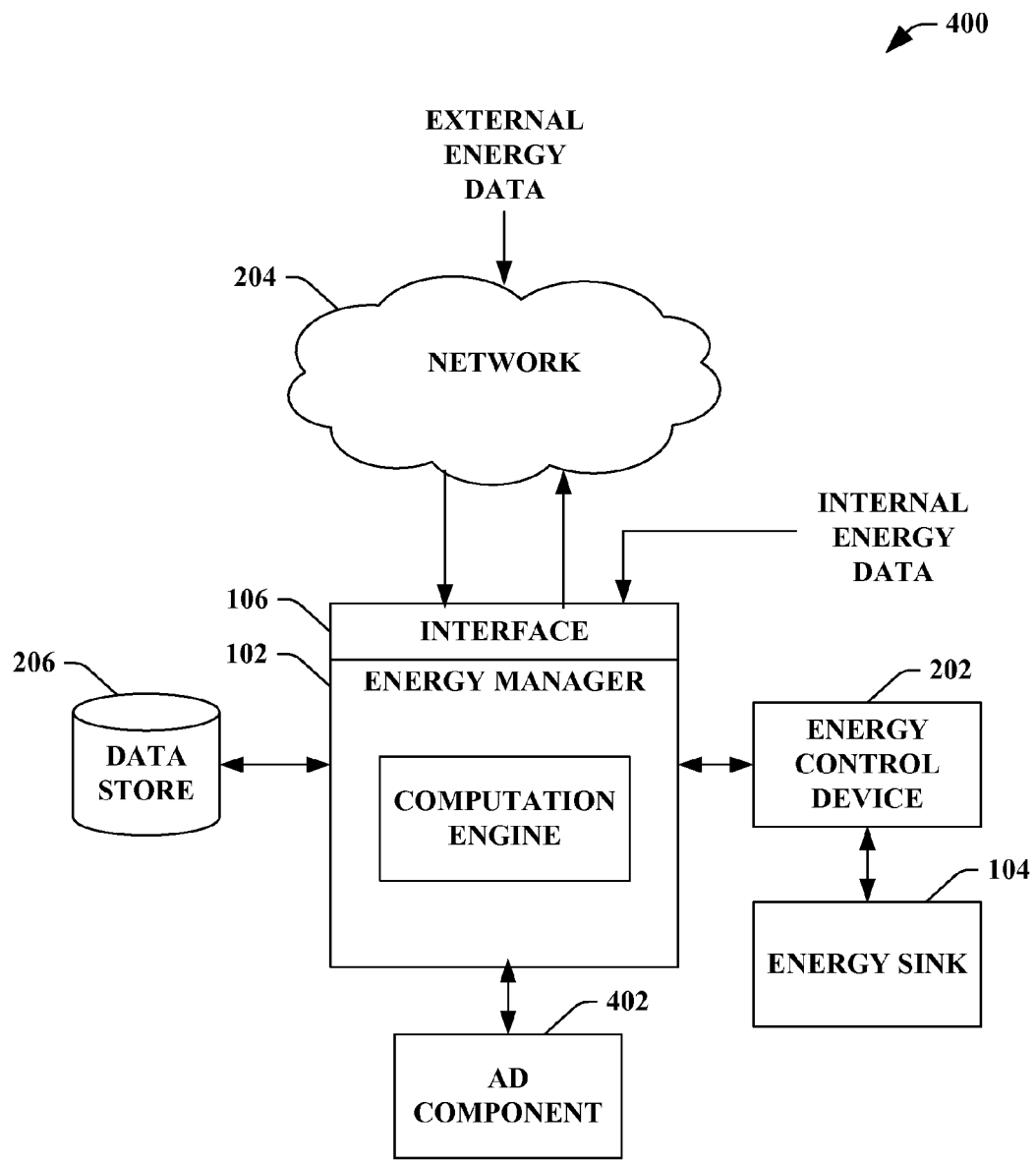
FIG. 4 illustrates a block diagram of an exemplary system that facilitates directly communicating advertisements based at least in part upon data evaluated for energy sink power management.

FIG. 4 illustrates a system 400 that facilitates directly communicating advertisements based at least in part upon data evaluated for energy sink device management. The system 400 can include the energy manager 102 that can leverage internal energy data and/or external energy data in order to efficiently control the energy sink 104 based at least in part upon analysis of such data with an algorithm. In particular, the energy manager 102 can glean information such as user state (e.g., presence, anticipated presence, absence, anticipated absence, etc.) and/or energy prices (e.g., cost per unit of consumption, energy rates, etc.) in order to operate the energy sink 104 in an optimal manner.

The system 400 can include an ad component 402 that can identify advertisements and/or information that relate to an entity (e.g., user, group of users, home, business, company, enterprise, etc.) employing the energy manager 102. In general, the ad component 402 can leverage the information (e.g., external energy data, internal energy data, inferred information, algorithm results from data, etc.) in order to provide relevant information to the entity. For instance, based at least in part upon the user state, user location, user preferences, etc., the ad component 402 can identify information applicable to the entity and/or the location. In one example, the ad component 402 can locate information via any suitable source (e.g., the Internet, network, websites, forums, etc.). In another example, the information that the ad component 402 can communicate can be designated from specific sources (e.g., sponsors, purchased advertisements, approved information, information targeted for a particular geographic location, etc.).

For example, the system 400 can be used to serve supplemental information obtained using the channels that carry the energy availability or user state information. Such supplemental information can be presented and/or displayed on the energy control device 202 and/or on audio-visual equipment connected to such devices within the home. In another example, the information can be communicated to any suitable device (e.g., television, monitor, computer, smartphone, plasma display, liquid crystal display (LCD), gaming device, portable media player, etc.). As an example, an energy control device can utilize a local display to provide additional information, helping improve the efficiency with which businesses deliver their goods and services to customers. The device can include status information from the energy control device itself, other content such as advertisement supported content, paid content, custom content as preferred by the user, etc. In one example, the information can be specifically tailored to the user's preferences and/or likings.

Note that the energy control devices can include significant knowledge about the user context and desire, such as the appliance intended to be used, presence at home, user activity based on appliances being turned on or motion sensors, etc. The ad component 202 can utilize this information to serve advertisements related to the user activities, appliance maintenance, and weather related behaviors observed at the user's home among other things.

Figure 5:
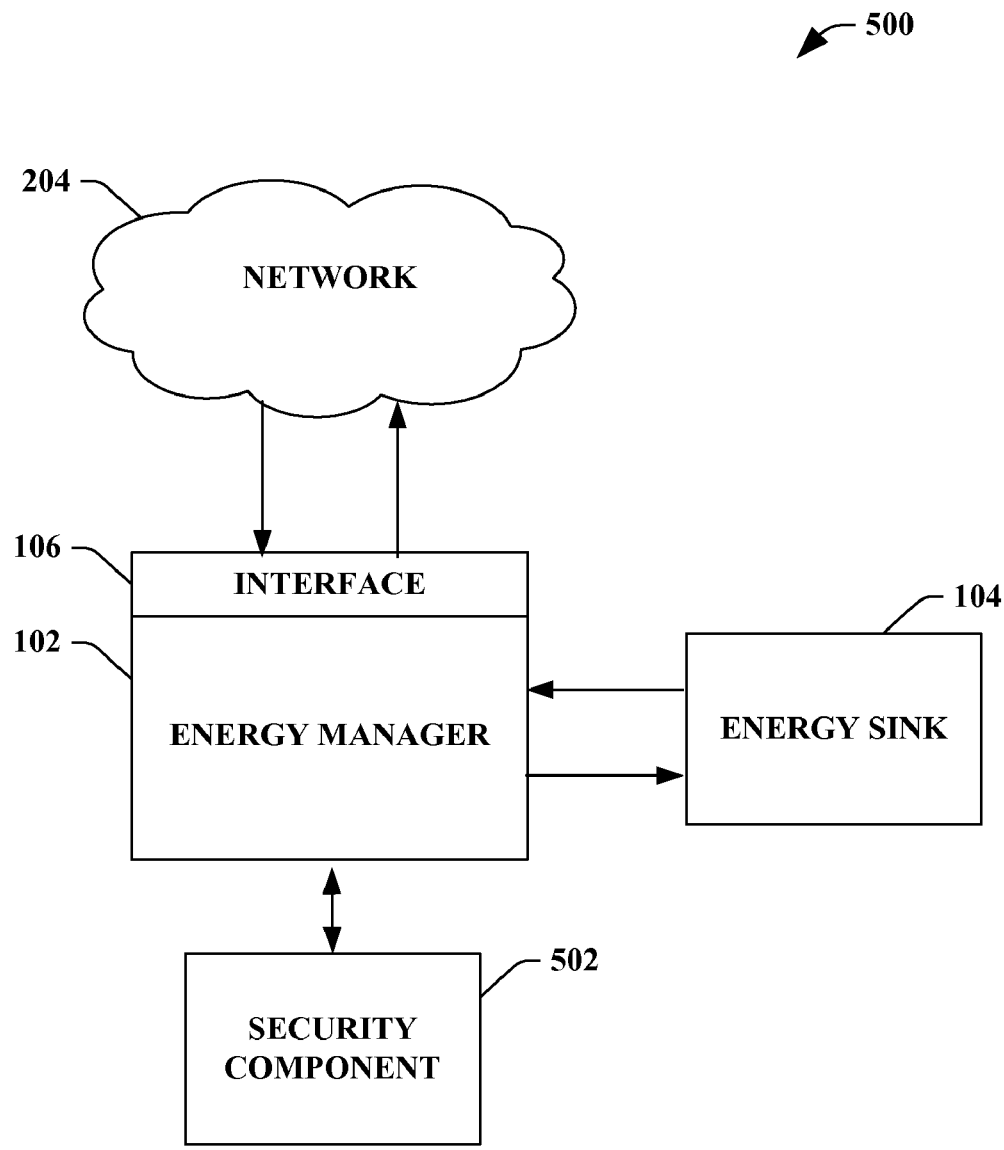
FIG. 5 illustrates a block diagram of an exemplary system that facilitates enhancing security with personalized options in relation to data collection for energy sink power management.

FIG. 5 illustrates a system 500 that facilitates enhancing security with personalized options in relation to data collection for energy sink device management. The system 500 can include a security component 502. In one aspect, the security component 502 can allow a user to opt in to data gathering, opt out of data gathering, etc., wherein data gathering can be related to collection of internal energy data, collection of external energy data, and/or any suitable combination thereof. In another example, the security component 502 can provide notice of data collection as well as providing the opportunity for an entity (e.g., user, group of users, business, home, family, enterprise, company, etc.) to provide consent, deny consent, etc. Moreover, the security component 502 can allow user access and management of any suitable data collected and/or data collection settings. For example, the user can edit/view data collections settings such as, type of data collected, access of collected, restrictions of data collections, etc. In general, the security component 502 can allow an entity to manage data collection preferences. In still another example, the security component 502 can secure data communications associated with personal data (e.g., private data, account information, etc.) by implementation of encryption, password protection and other methods.

The security component 502 can employ granular levels of security for the various amounts and types of data collected by the system 500. For example, a first level of data collected can be assigned with a first security level and a second level of data (e.g., more sensitive in comparison to the first level of data) can be assigned with a second security level (e.g., more secure in comparison to the first security level). Additionally, the data communications (e.g., external energy data, internal energy data, control specifications, user state information, etc.) utilized with the energy manager 102 can be protected with security techniques and/or mechanisms such as, but not limited to, passwords, usernames, cryptology, public and private keys, etc.

Figure 6:
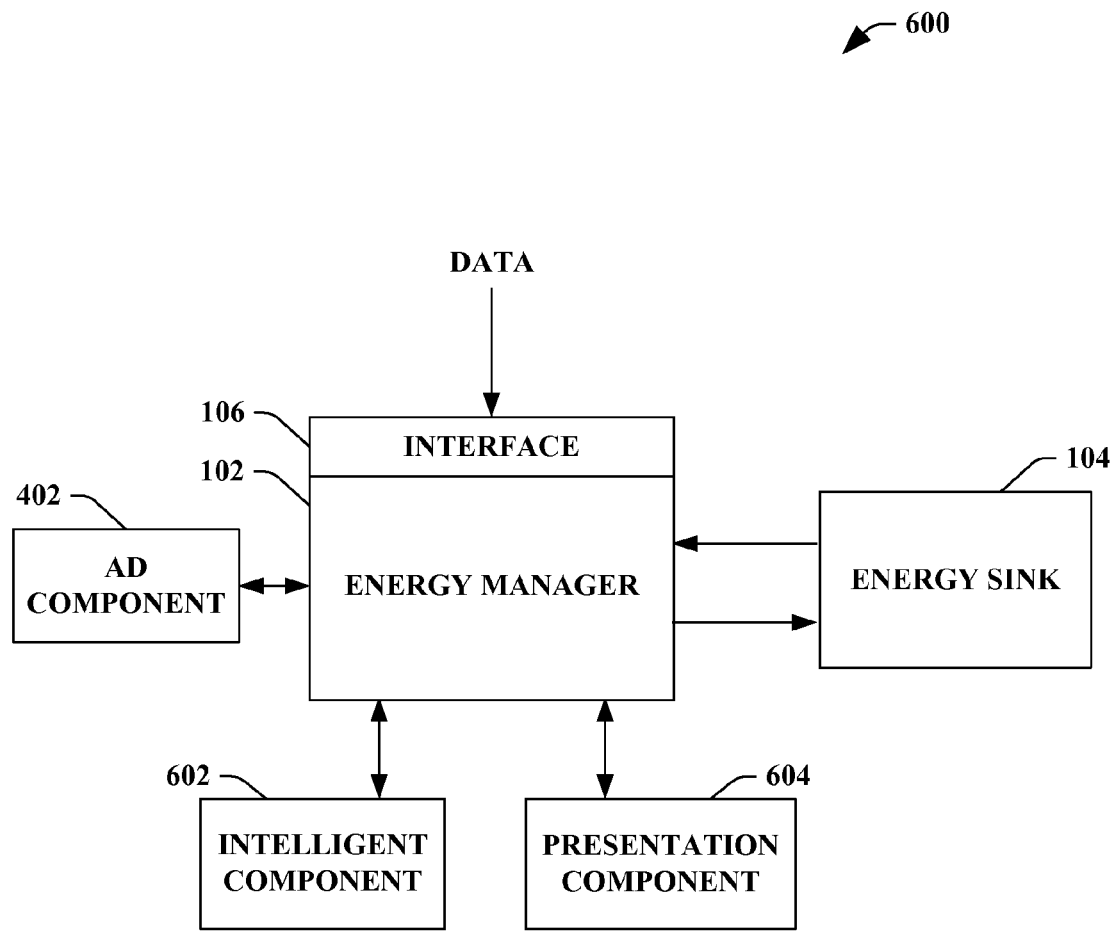
FIG. 6 illustrates a block diagram of an exemplary system that facilitates automatically collecting data for implementation of energy sink control and advertisement display.

FIG. 6 illustrates a system 600 that employs intelligence to facilitate automatically collecting data for implementation of energy sink device control and advertisement display. The system 600 can include the energy manager 102, the energy sink 104, the interface 106, and the ad component 402, which can be substantially similar to respective managers, sinks, interfaces, and components described in previous figures. The system 600 further includes an intelligent component 602. The intelligent component 602 can be utilized by the energy manager 102 for cost efficient and automatic control of the energy sink 104 based upon evaluation of gathered data (e.g., internal energy data, external energy data, data, energy rates, user state information, etc.). For example, the intelligent component 602 can infer weather data, energy consumption rates, energy quotes, user habits, user comfort settings, user preferences, user state (e.g., presence, anticipated presence, absence, anticipated absence, etc.), advertisements, information to communicate based on internal and/or external energy data evaluation, peak load times, grid stability, interpretation of motion data, interpretation of light sensing information, control specifications, flow of income, expenses, projected profit, etc.

The intelligent component 602 can employ value of information (VOI) computation in order to identify internal energy data and/or external energy data for a particular entity. For instance, by utilizing VOI computation, the most ideal and/or appropriate internal energy data and/or external energy data can be determined and utilized in order to utilize user-specific priority data. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example.

The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The energy manager 102 can further utilize a presentation component 604 that provides various types of user interfaces to facilitate interaction between a user and any component coupled to the energy manager 102. As depicted, the presentation component 604 is a separate entity that can be utilized with the energy manager 102. However, it is to be appreciated that the presentation component 604 and/or similar view components can be incorporated into the energy manager 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the energy manager 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
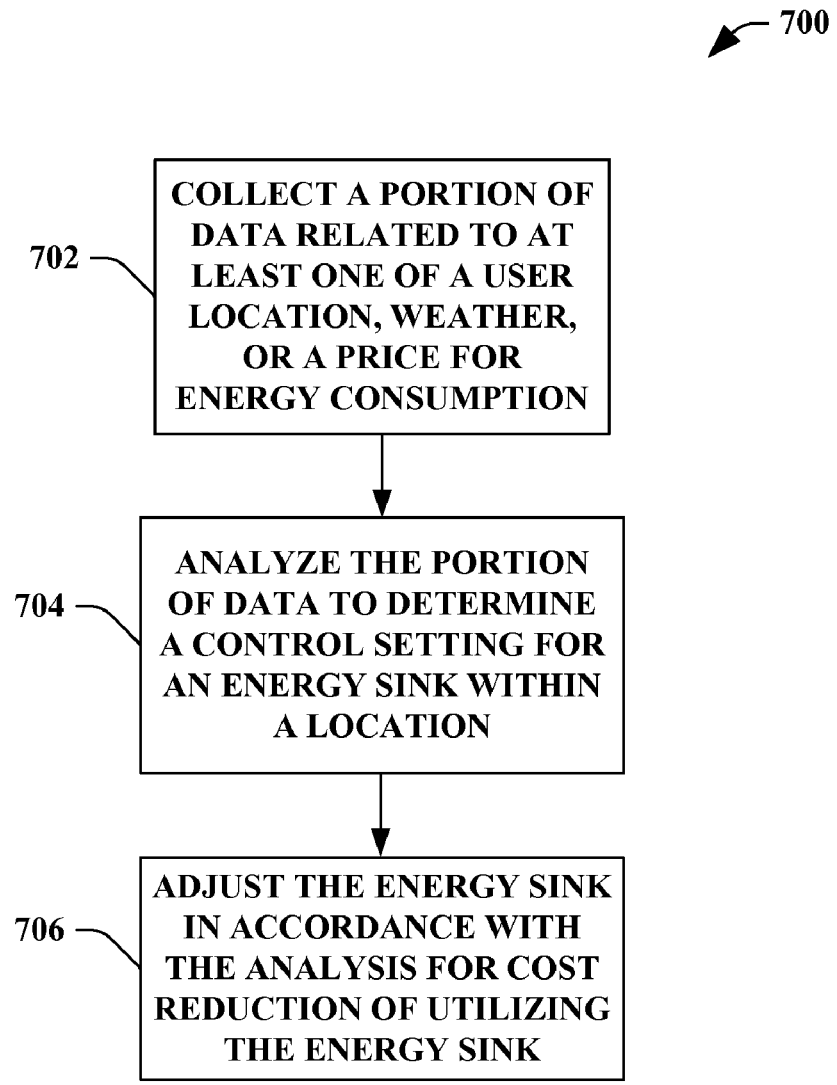
FIG. 7 illustrates an exemplary methodology for automatically controlling an energy sink based at least in part upon an evaluation of data related to energy prices.
Figure 8:
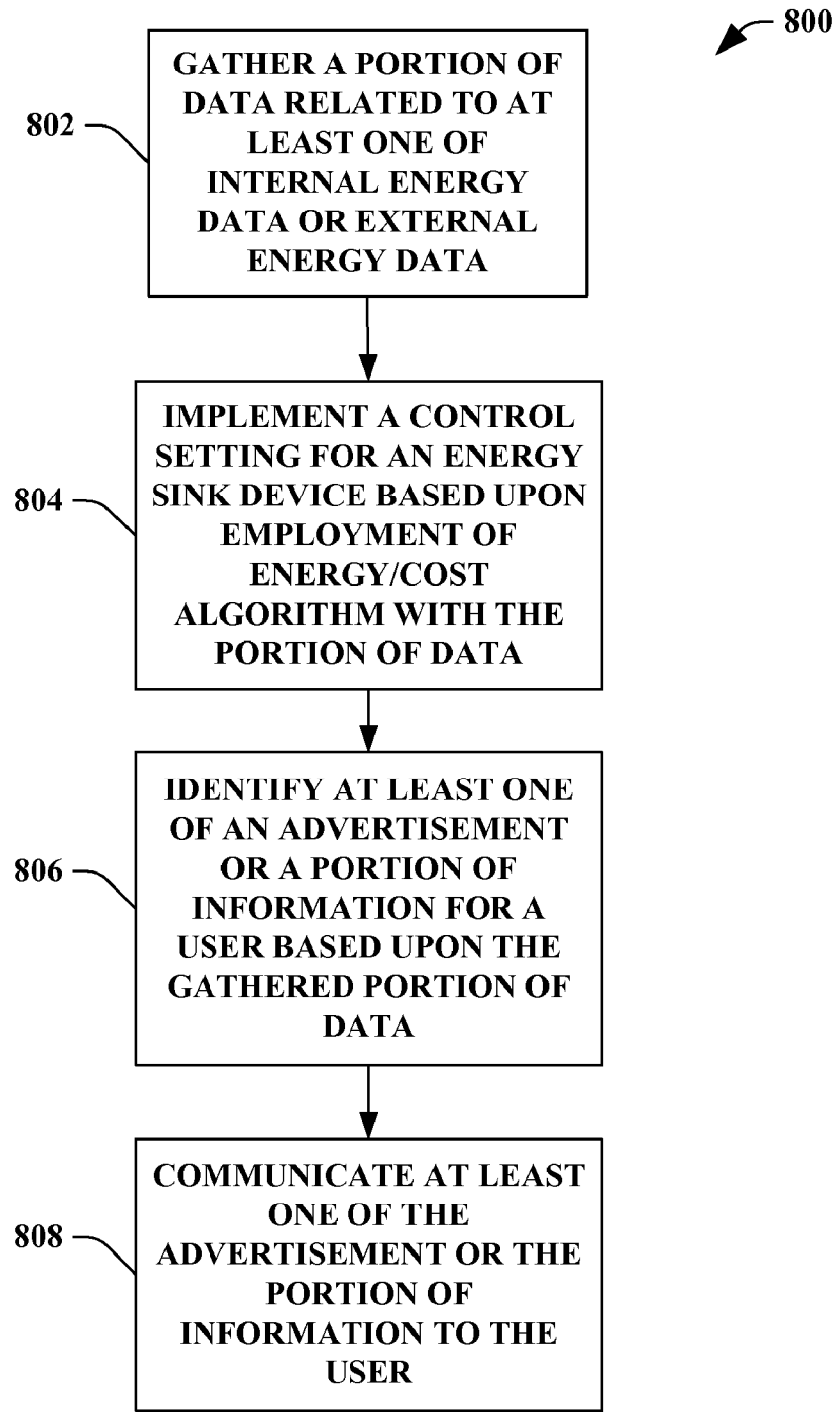
FIG. 8 illustrates an exemplary methodology that facilitates directly communicating advertisements based at least in part upon data evaluated for energy sink device management.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates automatically controlling an energy sink device based at least in part upon an evaluation of data related to energy rates. At reference numeral 702, a portion of data related to at least one of a user location, weather, or a price for energy consumption can be collected. The user location can be a location presence, an anticipated location presence, an absence from a location, an anticipated absence from a location, etc. It is to be appreciated that the location can be a home, a building, a structure, an enterprise, an apartment, a room, a company, etc. Moreover, the weather data can be any suitable data related to weather forecasts utilized to identify weather patterns, temperature, storms, etc. Price data for energy consumption can further be gathered, wherein the price data can be energy price data, energy price variations, discounts for energy usage reduction at specific time periods, etc.

At reference numeral 704, the portion of data can be analyzed to determine a control setting for an energy sink within a location. For instance, the energy sink can be, but is not limited to being, a heating unit, a heater, an HVAC system, an air conditioner, a light, a refrigerator, a household appliance, a freezer, an electronic unit (e.g., cable box, tuner, receiver, stereo, etc.), photo copy machine, a fax machine, a computer, a machine, a display (e.g., a monitor, a television, a plasma display, a liquid crystal display (LCD), etc.), and/or any other suitable device that consumes power and can be managed in order to conserve energy. In addition, the control setting determined can be, but is not limited to being, whether to power on the energy sink, power off the energy sink, adjust a setting associated with the energy sink, and/or any other suitable adjustment or manipulation with the energy sink. At reference numeral 706, the energy sink can be adjusted in accordance with the analysis for cost reduction of utilizing the energy sink.

FIG. 8 illustrates a method 800 for directly communicating advertisements based at least in part upon data evaluated for energy sink device management. At reference numeral 802, a portion of data related to at least one of internal energy data or external energy data can be gathered. It is to be appreciated that the external energy data can be, but is not limited to being, energy pricing data (e.g., cost per unit, inferred rates, real time quotes, etc.), weather data, peak load warnings, grid instability data, discounts for energy reduction (e.g., reduction of costs if energy not used at particular time, etc.), social networking services, calendar data (e.g., appointments, meetings, birthdays, events, location of events, locations of appointments, location of meetings, etc.), email information (e.g., inferred meetings, inferred or identified events, etc.), global positioning service (GPS), group information, forum information (e.g., postings, web forum memberships, etc.), purchases (e.g., online purchases, offline purchases, etc.), monetary information (e.g., income, expenses, profit, investment portfolio information, etc.), medical information (e.g., medical status, diagnostics, medical history, current condition, etc.), sensors (e.g., automobile information, temperature control information within a location, motion sensors, light sensing, heat sensing, temperature sensors, etc.), user state information external to the location, etc. Moreover, the internal energy data can be, but is not limited to being, energy sink data (e.g., make, model, year, type, efficiency rating, consumption rate, etc.), network resources within the home, motion sensors, heat sensors, security data, lighting use, thermostat data, user explicit information (e.g., preferences, priorities, etc.), etc.

At reference numeral 804, a control setting for an energy sink device can be implemented based upon employment of an energy/cost algorithm with the portion of gathered data. The control setting can be initiated by, for instance, an energy control device that controls the energy sink device. It is to be appreciated that the algorithm can be a first algorithm and/or a second algorithm as discussed above.

At reference numeral 806, at least one of an advertisement or a portion of information for a user can be identified for a user based at least in part upon the gathered portion of data and respective analysis. For example, a specific ad or portion of data can be identified for a user as relevant based at least in part upon evaluation of gathered data. At reference numeral 808, at least one advertisement or the portion of information can be communicated to the user. For example, the portion of data or the advertisement can be communicated to the energy control device and/or any other suitable device associated with the user (e.g., smartphone, computer, laptop, television, monitor, hand-held, portable media device, gaming console, portable gaming device, etc.).

Figure 9:
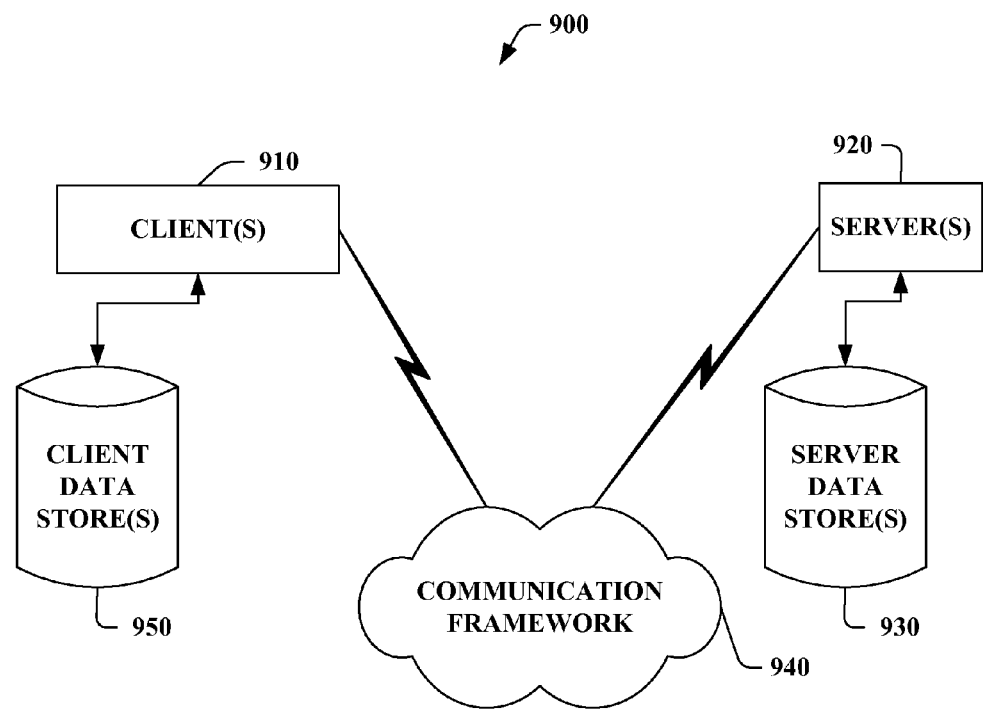
FIG. 9 illustrates an exemplary networking environment, wherein the novel aspects of the claimed subject matter can be employed.
Figure 10:
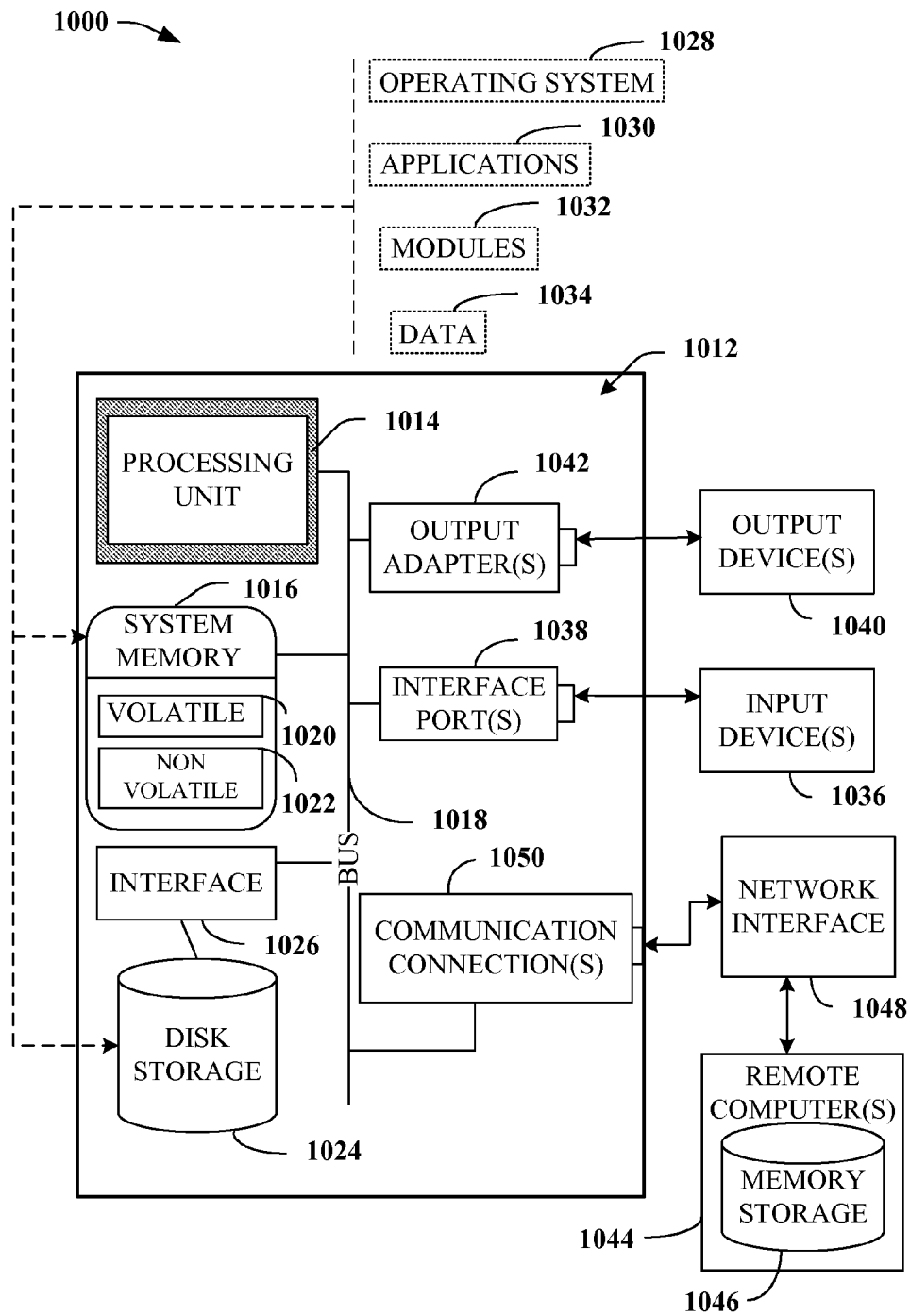
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an energy manager that evaluates data such as user state information and energy rate information for efficient control of energy sinks, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system, comprising:
    an energy sink configured to consume a portion of energy;
    an interface component configured to receive a portion of data related to detection of an occupancy;
    an energy manager configured to dynamically control the energy sink with respect to consumption of the portion of energy based at least in part upon an evaluation of the portion of received data; and
    the energy manager configured to employ at least one of a power on or power off of the energy sink, or an adjustment of a setting for the energy sink, based on the detection of the occupancy.

2. The system of claim 1, wherein the energy sink includes at least one of a heating unit, a heater, an HVAC system, an air conditioner, a light, a refrigerator, a household appliance, a freezer, an electronic unit, a cable box, a tuner, a receiver, a stereo, a photo copy machine, a fax machine, a computer, a machine, or a display.

3. The system of claim 1, wherein the portion of data includes a portion of external energy data related to a location, the portion of external energy data including at least one of energy pricing data, weather data, a peak load warning, grid instability data, a discount for energy reduction, a social networking service, a portion of calendar data, email information, a global positioning service (GPS) device, a portion of group information, forum information, a purchase, monetary information, medical information, sensors, or a portion of state information external to a location related to the energy sink device.

4. The system of claim 1, wherein the portion of data includes a portion of internal energy data related to a location, the portion of internal energy data including at least one of a portion of energy sink data, a heating property, a cooling property, a heat loss characteristic, a heat gain characteristic, a network resource within the location, a motion sensor, a heat sensor, a portion of security data, an amount of lighting use, a portion of thermostat data, or a portion of state information internal to a location related to the energy sink device.

5. The system of claim 4, wherein the portion of state information relates to the location and is includes least one of an absence, an anticipated absence, a presence, or an anticipated absence.

6. The system of claim 4, wherein the portion of external energy data is configured to be communicated via at least one of a network, the Internet, a website, a web forum, a service, an entity, a business, a device, or a machine.

7. The system of claim 4, further comprising a security component configured to require consent for collection of the internal energy data in accordance with at least first and second levels of sensitivity of the internal energy data.

8. The system of claim 1, further comprising an ad component configured to identify at least a portion of an advertisement based on the evaluation.

9. The system of claim 8, wherein the ad component is configured to communicate the portion of the advertisement.

10. The system of claim 9, wherein the ad component is configured to communicate the portion of the advertisement via at least one of a television, a monitor, a computer, a smartphone, a plasma display, a liquid crystal display (LCD), a gaming device, a portable media player, an energy control device, a gaming console, a portable digital assistance (PDA), a laptop, a hand-held, a portable media device, or a data browsing device.

11. The system of claim 10, wherein the ad component is configured to communicate information via at least one of a wired channel or a wireless channel.

12. The system of claim 10, wherein the energy control device includes at least one of a switch, a thermostat, a power switch, a digital switch, a mode, a setting on a device, or a control module related to the energy sink.

13. The system of claim 11, further comprising a security component configured to receive the portion of data based at least partly on first and second levels of sensitivity associated with the portion of data.

14. The system of claim 1, further comprising a computation engine configured to utilize an energy/cost optimization algorithm to control the energy sink device to provide at least one of the following:
    at least one of an energy loss or an energy gain determined via training;
    implementation of a model to formulate an optimization problem; and
    adaptation of a result of the energy/cost optimization algorithm based upon the portion of data changing.

15. The system of claim 14, wherein the algorithm configured to process data corresponding to at least one of an energy price change and or a weather change.

16. The system of claim 14, wherein the algorithm is configured to process data related to at least one of a presence, an absence, a portion of weather data, or an energy price change.

17. A computer-implemented method, comprising:
    collecting a portion of data related to detection of an occupancy of a location;
    analyzing the portion of data to determine a control setting for an energy sink within the location; and
    adjusting the energy sink in accordance with the analyzing, for cost reduction of utilizing the energy sink.

18. The method of claim 17, further comprising utilizing the energy sink in the form of at least one of a heating unit, a heater, an HVAC system, an air conditioner, a light, a refrigerator, a household appliance, a freezer, an electronic unit, a cable box, a tuner, a receiver, a stereo, a photo copy machine, a fax machine, a computer, a machine, or a display.

19. The method of claim 17, further comprising applying security with regard to collection of the portion of data in accordance with at least first and second levels of sensitivity associated with the portion of data.

20. A computer-readable storage medium storing instructions, the instructions if executed by a computing device causing the computing device to perform operations comprising:

utilizing an energy sink to consume a portion of energy;

receiving a portion of data related to detection of an occupancy;

for dynamically controlling the energy sink with respect to consumption of the portion of energy based at least in part upon an evaluation of the portion of received data; and via the dynamically controlling, employing at least one of a power on of the energy sink device, a power off of the energy sink device, or an adjustment of a setting for the energy sink device.

* * * * *

UNITED STATES PATENT AND TRADEMARK OFFICE
CERTIFICATE OF CORRECTION

PATENT NO. : 7,953,518 B2
APPLICATION NO. : 12/206092
DATED : May 31, 2011
INVENTOR(S) : Aman Kansal et al.

It is certified that error appears in the above-identified patent and that said Letters Patent is hereby corrected as shown below:

In column 20, line 54, in Claim 15, after "algorithm" insert -- is --.

In column 20, line 56, in Claim 15, before "or a" delete "and".

In column 22, line 4, in Claim 20, before "dynamically" delete "for".

Signed and Sealed this
Ninth Day of August, 2011

David J. Kappos
*Director of the United States Patent and Trademark Office*